Jan. 6, 1959

R. J. BURG 2,867,156

APPARATUS FOR MAKING PLASTIC BAGS

Filed July 18, 1956

INVENTOR:
Robert J. Burg
BY
Frederick Breitenfeld
ATTORNEY

Jan. 6, 1959 R. J. BURG 2,867,156
APPARATUS FOR MAKING PLASTIC BAGS
Filed July 18, 1956 3 Sheets-Sheet 2
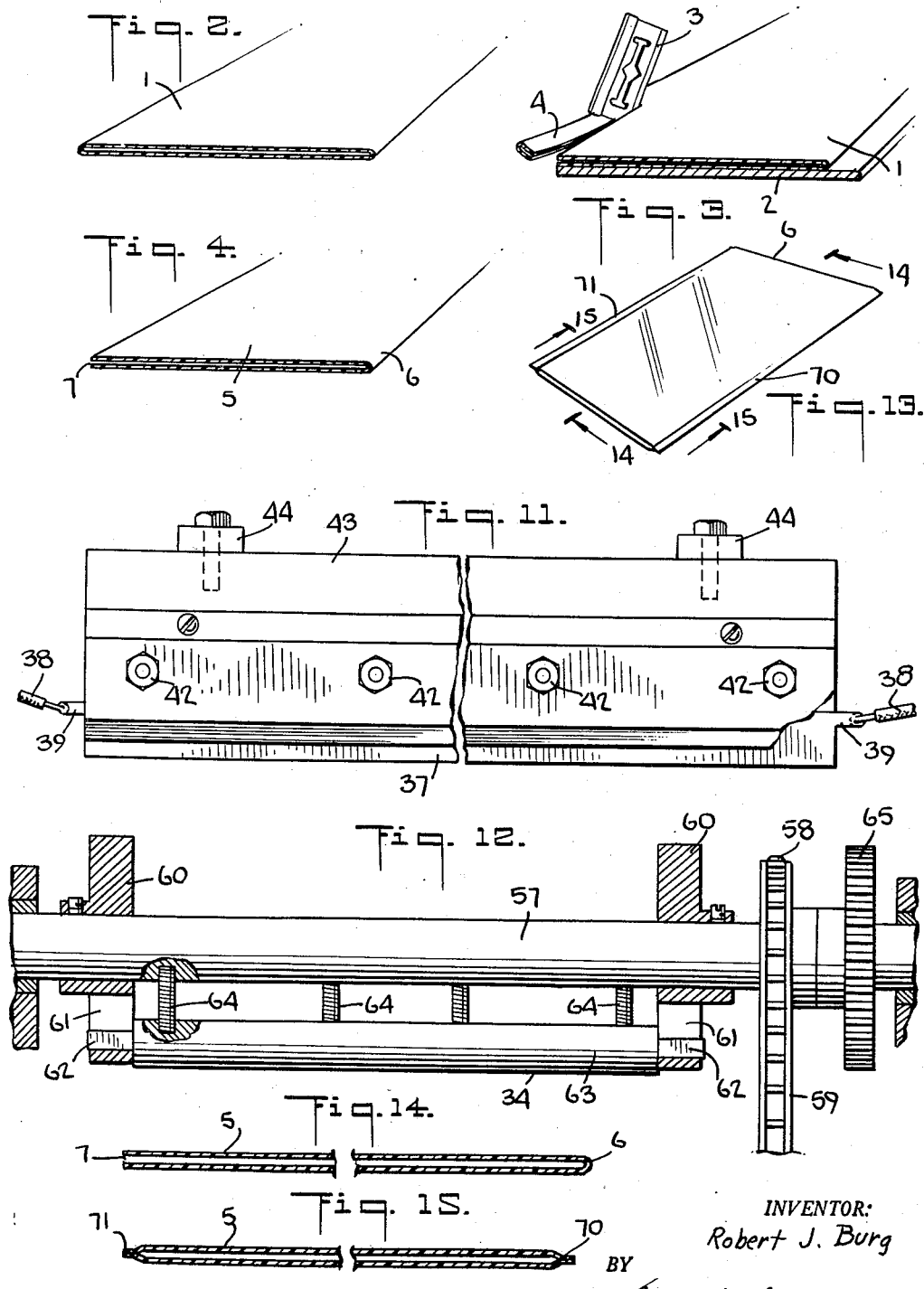
INVENTOR:
Robert J. Burg
BY
Frederick Breitenfeld
ATTORNEY

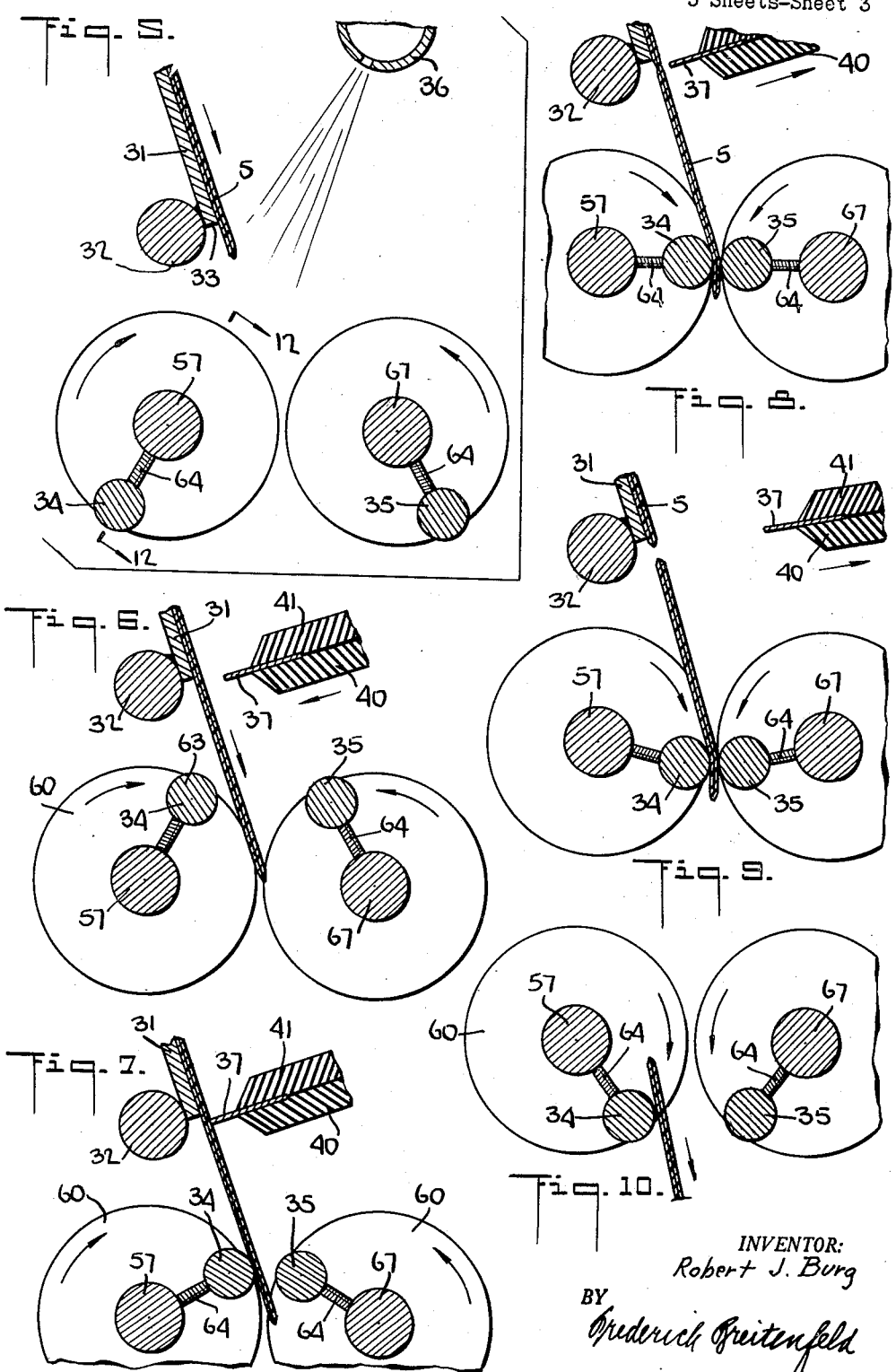

United States Patent Office 2,867,156
Patented Jan. 6, 1959

2,867,156

APPARATUS FOR MAKING PLASTIC BAGS

Robert J. Burg, Dobbs Ferry, N. Y.

Application July 18, 1956, Serial No. 598,683

8 Claims. (Cl. 93—8)

This invention relates generally to the manufacture of plastic bags, and has particular reference to bags composed of thermoplastic material and having one or more edges closed by heat-sealing.

It is a general object of the invention to provide an improved apparatus and procedure whereby the rate of production of such bags can be increased and the cost reduced, and whereby many of the problems and difficulties heretofore encountered are obviated.

At the present time, bags of the type referred to are usually made by the feeding of a two-ply folded strip, and joining the layers by the production of spaced-apart transversely-arranged relatively wide bands of joinder. After the joined areas are produced by the application of heat, the strip is advanced for a considerable distance to a knife or other cutter which severs the strip through the joined areas, thus dividing the strip into bags. This results in relatively slow production, because the cutting means cannot properly operate upon the heat-sealed areas while the strip is softened in these areas and there is necessarily a delay between the sealing and cutting operations. Moreover, proper constant registry of the cutter with the fused areas is difficult to maintain, requiring repeated adjustments in order to secure accuracy of cut.

It is an object of the invention to provide an apparatus and method by which bags can be produced speedily and accurately, and by which the sealing and severance of the bags from the folded strip is simultaneous, thus materially increasing production speed.

A feature of the invention lies in the provision of means, and in the procedural step, whereby each completed bag is instantly pulled away from the strip immediately upon completion of the simultaneous sealing and cutting operation.

An important object of the invention is to obviate the disadvantages inherent in the usual type of apparatus or procedure in which the sealing or cutting is sought to be accomplished by pressure upon the plastic material while it rests on a support or anvil. Under such circumstances there is a tendency for the heat-softened material to adhere to one or the other of the pressure surfaces, and for the plastic to leave undesirable residues on them. Each of these occurrences slows production and requires constant interruptions and adjustments. In the improved apparatus and procedural operation of this invention a heated element is caused to be effective upon the plastic strip in a unique manner, involving no pressure surfaces and hence no tendency toward undesirable adhesions or deposits.

A feature of the invention resides in supporting the plastic strip upon a flat rigid surface with a bag-sized section projecting beyond said surface, and in causing a heated blade to be effective upon the strip in an unsupported region just beyond the support.

With these and other objects in view, I have devised the arrangement of parts and the sequence of procedural steps now to be described, and more particularly pointed out in the claims appended hereto.

In the accompanying drawings, wherein an illustrative embodiment of the invention is disclosed, Fig. 1 is an elevational view, somewhat diagrammatically shown, of an apparatus constructed in accordance with the invention;

Fig. 2 is a perspective view of the tubular strip of thermoplastic material from which the bags are made, the view being taken on the line 2—2 of Fig. 1;

Fig. 3 is a view showing how one longitudinal edge portion is severed from the tubular strip prior to the sealing operation, the view being taken on the line 3—3 of Fig. 1;

Fig. 4 shows how the strip appears after the edge portion has been cut therefrom, the view being taken on the line 4—4 of Fig. 1;

Fig. 5 is a view at one stage of operation, of the mechanism in the region of the sealing and separating position;

Fig. 6 shows the same mechanism, with the strip in position for sealing and separation and the heated blade approaching the strip to perform its sealing and separating operation;

Fig. 7 is a similar view showing the strip in its position of halt while the heated wire or blade contacts with it and seals and separates a bag from the strip;

Fig. 8 shows the strip with its forward end portion engaged by grippers, and the grippers starting the beginning of movement to draw the bag away from the remainder of the strip;

Fig. 9 is a similar view showing the bag drawn away from the strip by the action of the grippers;

Fig. 10 shows the separated bag released by the grippers and free to fall onto a conveyor or into a collection receptacle;

Fig. 11 is an enlarged plan view of the combined sealing and separating head;

Fig. 12 is a detail sectional view, taken substantially on the line 12—12 of Fig. 5;

Fig. 13 is a perspective view of a completed bag;

Fig. 14 is a sectional view, taken substantially on the line 14—14 of Fig. 13; and Fig. 15 is a sectional view, taken substantially on the line 15—15 of Fig. 13.

Figure 1:
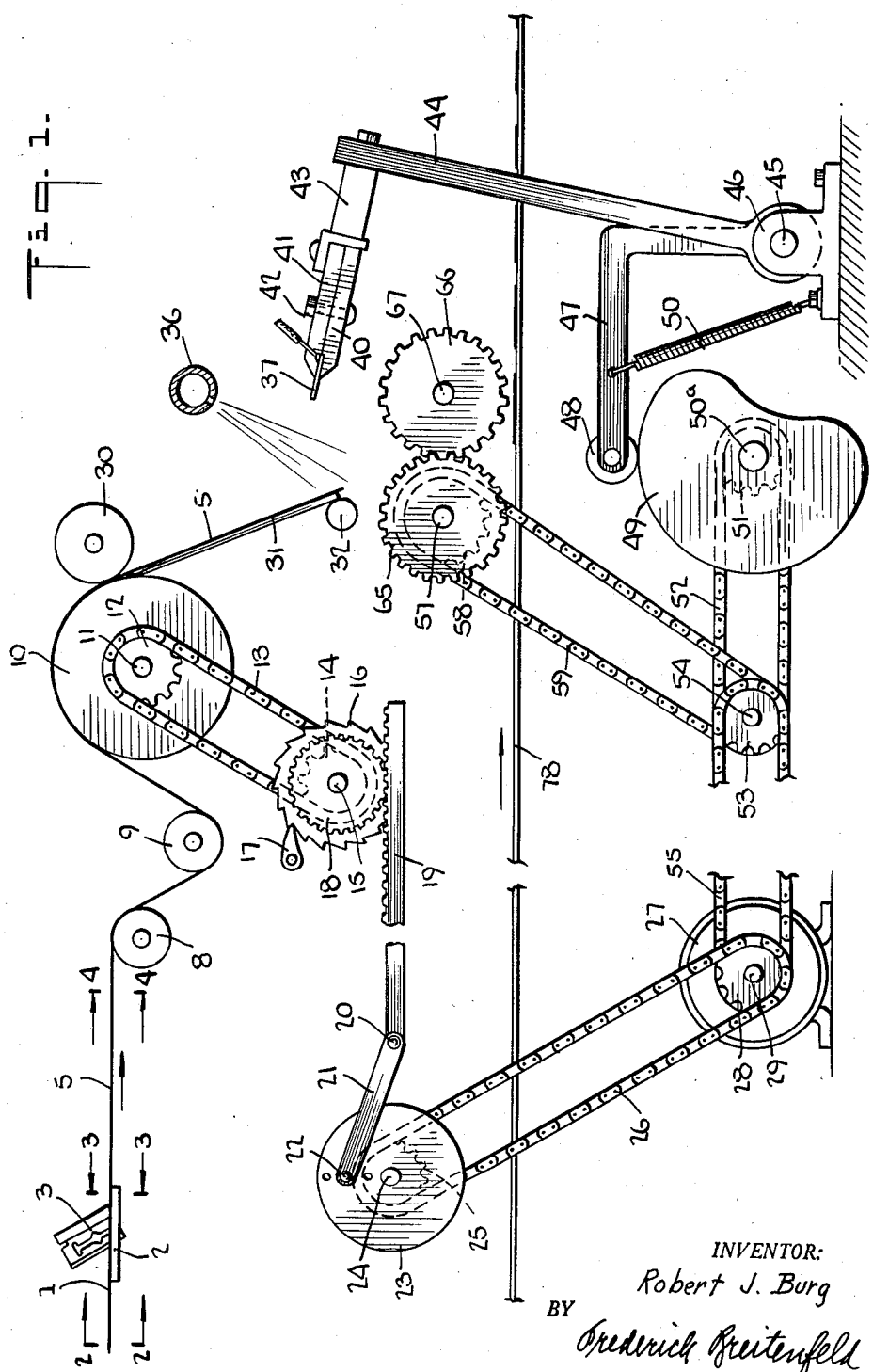

The strip of thermoplastic material initially fed into the apparatus shown in Fig. 1 is a commercially-available product in the form of a flattened tube of substantial length supplied in roll form. In the apparatus shown, this tubular strip 1 is moved toward the right from a supply roll or other source (not shown) until it passes over a plate or other supporting element 2, at which an inclined cutter blade 3 is positioned. As the strip is moved toward the right, the blade 3 will operate on it to sever a marginal edge piece 4 (Fig. 3) along one of the longitudinal edges of the strip. This transforms the tubular strip 1 into a doubled-over or folded, two-ply formation (shown at 5 in Fig. 4) wherein the two layers of the strip are joined along one marginal edge 6, and are unconnected along their opposite edges 7. The closed bottoms of the bags to be formed from the folded strip 5 are produced by the fold 6 and the open mouths of the bags result from the unconnected opposite edges of the two plies of the strip.

As the strip proceeds toward the right in Fig. 1, it is drawn over the tension rolls 8 and 9 and then over the driven feed roll 10 which is intermittently rotated. The intermittent movement of the feed roller may be provided for in various ways. For example, the feed roll 10 may be secured on a shaft 11 carrying a sprocket 12 around which a chain 13 extends. Chain 13 may extend around a sprocket 14 secured on a shaft 15 which carries ratchet wheel 16 engaged by the pawl 17. Gear 18 on the shaft 15 may be engaged by a reciprocating rack 19, having one end pivotally connected at 20 to the end of a connecting rod 21. The opposite end of the connecting rod 21 may be pivotally attached at 22 to the eccentric disk 23 constituting a crank by which the rack 19 is reciprocated. This end of the connecting rod 21 may be connected at different points on disk 23 to thereby regulate the stroke of the rack and control the length of fed of the strip. The eccentric disk 23 may be secured on a rotatable shaft 24 which carries a sprocket 25 engaged by the chain 26. In the construction illustratively shown, an electric motor 27 has a sprocket 28 secured on its shaft 29 and the chain 26 is engaged by the sprocket 28.

The arrangement is such that when the motor 27 is operated, it will continuously rotate the eccentric disk 23 which will reciprocate the rack 19 to cause the shaft 15 to be intermittently rotated through the ratchet mechanism on said shaft. This will cause the feed roll 10 to be intermittently rotated and it will feed the strip 5 for a predetermined distance. The parts are so designed, and adjusted in operation, that each advancement of the strip 5 will bring the next successive bag-size section (whatever the desired bag-size may be) to a position for final sealing and separation.

Located adjacent to the feed roll 10 is a pressure roll 30, and the strip 5 enters between the two rolls 10 and 30 to be fed thereby over the face of an inclined flat rigid supporting plate 31. Adjacent to its lower end, the supporting plate 31 is secured to a fixed rod 32, forming part of the framework of the apparatus. As will be seen in Figs. 5, 6 and 7 the strip 5 is moved down over the face of the plate 31 until a portion of the strip of slightly more than the width of a bag is extended beyond the lower edge 33 of the inclined supporting plate 31. When this feeding movement of the strip takes place, this extended bag-sized portion of the strip is directed to a position where it can be engaged between the grippers generally indicated at 34 and 35, which grippers will act to draw away the sealed and separated portion of the strip in the form of a bag. The directing of the bag-sized part of the strip into position for this engagement by the grippers is facilitated by an air blast from a pipe 36.

As the strip is fed downward toward the position where it is engageable by the grippers 34 and 35, it reaches the location shown in Fig. 7 where the simultaneous separation and sealing takes place. The device for performing this operation consists of a thin flattened, heated blade or element 37 which is moved into impingement with the strip to simultaneously separate one of the bags from the strip, seal the trailing edge of that bag, and seal the leading edge of the following bag. The blade 37 is heated to the desired high temperature by a suitable source of current conveyed to the blade by the wires 38, connected to the blade as shown at 39 in Fig. 11. The temperature of the blade can be controlled by suitable thermostatic means (not shown). The blade 37 is held between a pair of jaws 40 and 41, of heat-resistant material, the jaws being maintained in clamping relation by means of the bolts 42. The jaws are mounted in a head 43 supported at the upper ends of arms 44, secured on a rocking shaft 45. Shaft 45 is rotatively mounted in the fixed bearings 46, and also secured on said shaft 45 is a bent arm 47 provided with a cam roller 48 at its end. The cam roller 48 is maintained in contact with the edge of a cam 49 by means of a coil spring 50 which has one end attached to the bent arm 47 and its opposite end secured to the base on which the bearings 46 are mounted. This arrangement is such that the movement of the hot element 37 against the strip 5, to perform the separation and sealing operation, is caused by the pull of the spring 50 rather than by the action of the cam 49. Thus, should the blade 37 accidentally encounter an object or obstacle inadvertently interposed, during its movement toward the strip 5, the spring 50 will prevent the imposition of damaging force.

The cam 49 is mounted on a continuously-rotated shaft 50a, carrying a sprocket 51 around which a chain 52 extends, said chain extending to a sprocket secured on a shaft 54, the shaft 54 being driven by the chain 55 from a sprocket mounted on the motor shaft 29. From the arrangement described, it will be apparent that the blade or element 37 is moved toward and away from the thermoplastic strip at the required times to contact with the strip and transversely unite or seal together the two plies thereof and simultaneously separate one of the bags from the strip. Reference to Figs. 5 to 10 will make this operation clear.

In Fig. 5 the strip 5 is shown in the process of being fed to sealing and separating position. In Fig. 6 the strip has reached that position, and it is halted during one of the pauses in the operation of feed roll 10. The portion of the strip that is at this time dependent below the lower edge 33 of the supporting plate 31 is slightly longer than the width of the bag to be separated from the strip. The blade 37 is operated in timed relation to the movements of the strip 5 so that during the above-mentioned pause in the feeding of the strip, the blade will be swung inwardly toward the strip to impinge against the same along a transverse line just below the lower end 33 of the supporting plate 31 as shown in Fig. 7. The high temperature of the blade 37 fuses the two plies of the strip together and at the same time provides a transverse weakened severance line across the sheet so that when a longitudinal pull is exerted on the strip just as the blade is withdrawn from contact therewith (Fig. 8) the end portion of the strip, constituting a finished bag, is pulled away or separated from the remainder of the strip as is shown in Fig. 9. This longitudinal pull or withdrawal of the bag from the remainder of the strip is performed by the grippers 34 and 35 now to be described. Since the two grippers are substantially similar, a description of that indicated at 34 will suffice for both.

Gripper 34 includes a driven shaft 57 which carries a sprocket 58 engaged by a chain 59 that extends around a sprocket mounted on the shaft 54. Secured on the shaft 57 are spaced disks 60, each of these disks being formed with a radial slot 61 in which the square ends 62 of a gripper rod 63 extend. Springs 64 are interposed between the gripper rod and the shaft 57 and tend to urge the gripper rod outwardly to an extent that its rounded edge extends just beyond the peripheries of the disks 60, as shown in Fig. 12. The gripper shown at 35 is similar to that shown at 34 and it is rotatively driven by gear 66 carried by the shaft 67, the gear 66 being in mesh with gear 65 on the shaft 57.

Referring again to Fig. 7 it will be observed that the hot blade 37 has impinged against the strip and at this time the lower sealed end of the strip is entering between the grippers 34 and 35 preparatory to being engaged by them. In Fig. 8 the blade 37 has completed the fusing or sealing action and has moved slightly away from the strip. The lower end of the strip is at this time engaged between the grippers which are being rotatively moved in the directions indicated by the arrows and a pulling action is being imposed on the sheet so that the newly-formed bag is physically separated from the remainder of the strip along the line of fusion. It will be understood that the movement of the bag away from the remainder of the strip is faster than the feed of the strip to sealing and separating position, so that each bag, produced in the manner described, will be moved out of the path of movement of the new end of the strip as it is fed to the sealing and separating position for the next operation.

In Fig. 9 the grippers are shown as having exerted sufficient pull upon the formed bag to fully separate it from the strip and are moving it away from the strip. Finally, as shown in Fig. 10, the grippers in their rotative movement reach a point of separation, thereby releasing the bag, which falls onto a conveyor indicated at 78 in Fig. 1.

From the foregoing, the advantages of the described mechanism will be apparent. The operation is simple, speedy, and reliable. The flattened tubular strip 1 is fed to the knife 3, where one longitudinal edge is removed. The strip, now formed as indicated at 5, is intermittently fed over the supporting plate 31 so that an approximate bag-size section extends below the lower end of the plate. The hot blade then contacts with the upper end portion of the dependent part of the strip to simultaneously fuse and separate a newly-completed bag from the strip. The grippers engage the newly-formed bag and exert a pull on it, and since the strip is transversely weakened by the heat imposed on it by the blade 37, the bag portion will be pulled away from the strip and then released to fall onto the conveyor. During this sequence of steps there is no pressure of the heat-softened region against any backing to which it might adhere; the pull of the grippers and the blast of air prevent adhesion to the heated element itself and avoid the possibility of any "healing" action along the fused line; and the temperature of the heated element may be so regulated that undesirable deposits of residual softened plastic may be completely avoided. Obviously, since fusion and separation are simultaneously accomplished, there are no problems of alignment, nor maladjustments due to stretching of the plastic material during travel from one position to another. As a result, the efficiency of operation of the apparatus, as well as the rate of output, are unusually high.

As will be seen in Figs. 13 to 15 inclusive, the completed bag is open at one edge, as indicated at 7. The bottom of the bag is formed by the fold 6, and the side edges are sealed as shown at 70 and 71.

Although I have described only a single embodiment of the invention, it is obvious that the invention is not to be restricted thereto, but is broad enough to cover all structures coming within the scope of the annexed claims.

Having thus described my invention what I claim as new and desire to secure by Letters Patent is:

1. In an apparatus for making bags from thermoplastic material, means for intermittently feeding a strip of flattened, tubular thermoplastic material, a knife operative to sever a marginal edge portion from the strip to thereby transform the strip into two-ply, single-fold formation, a flat rigid support over which the transformed strip is fed and at which the strip is halted with a bag-sized section thereof extending beyond the edge of the support, a heated element adapted to contact the strip at a point beyond the support to thereby fuse together the plies of the strip and separate the bag-sized section thereof from the remainder of the strip, means for swinging the heated element to and from the strip while the strip is in position of rest, and a gripping device for engaging the end portion of the bag-sized section and drawing the section away from the remainder of the strip immediately upon completion of the combined fusing and separating operation by the heated element.

2. In an apparatus for making bags, the combination of elements defined in claim 1, wherein the gripping device consists of a pair of resiliently-mounted jaws between which the bag-sized section is engaged, said jaws being rotatively mounted to engage the strip during a portion of their arcuate movement and release the strip during another portion of said movement.

3. In an apparatus for making bags from thermoplastic material, means for intermittently feeding a flattened, tubular strip of the material, cutting means in the form of an inclined knife past which the strip is fed and which is operative to sever a marginal edge portion from the strip to thereby transform it into two-ply, single-fold formation, an inclined flat support over which the strip is fed and at which the strip is halted in a manner to provide a bag-sized section thereof extending downwardly beyond the support, a heated blade and means for moving it back and forth along a path to and from the strip to bring it into contact therewith at a point below the support while the strip is in a position of rest to thereby cause the blade to form a transverse line of fusion across the strip and fuse together the two plies thereof and separate the bag-sized section from the remainder of the strip, and means in the form of a pair of cooperative grippers for engaging said bag-sized section of the strip at one end and drawing the section away from the remainder of the strip immediately upon the completion of the combined fusing and separating operation.

4. In an apparatus for making bags from thermoplastic material, means for intermittently advancing a flattened two-ply strip of the material, the plies being joined along one longitudinal edge but disconnected along the other, an inclined flat rigid support over which the strip is fed and at which the strip is halted in a manner to provide a bag-sized section thereof extending downwardly beyond the support, a heated blade extending transversely with respect to the direction of strip advancement, means for mounting the blade for back and forth movement along a path toward and away from the strip along a line just below said support, means for moving the blade along said path in timed relation to said intermittent strip advancement so that it comes in contact with the strip during each halting of the strip, said blade producing a transverse line of fusion to join together the two plies of the strip and simultaneously separate the bag-sized section from the remainder of the strip, means for gripping said bag-sized section at the advanced end thereof and drawing the section away from the remainder of the strip immediately upon the completion of the combined fusing and separating operation of said blade, said gripping means comprising a pair of opposed grippers mounted for movement into and out of strip-engaging relation, and means for moving said grippers in timed relation to the strip-advancing and blade-moving means.

5. In an apparatus for making bags from a two-ply single-fold strip of thermoplastic material, a strip support, means for intermittently feeding said strip over said support through increments of advance each of which brings the strip to a position of rest upon said support with a bag-sized strip section extending in unsupported condition beyond said support, a movable heated element, means for moving the heated element back and forth along a path to and from the strip so as to contact the strip while the strip is in a position of rest, said heated element being so located that it contacts the strip at a point just beyond said support to thereby fuse together the plies of the strip and separate said bag-sized section from the remainder of the strip, and means for drawing the bag-sized section away from the remainder of the strip upon completion of the combined fusing and separating operation by the heated element.

6. In an apparatus for making bags, the combination with the elements defined in claim 5, of means for directing an air blast against the bag-sized section of the strip to maintain it adjacent to the support, and the means for drawing the bag-sized section away from the remainder of the strip consisting of a pair of cooperatively arranged rotary grippers which engage the separated bag-sized section between them and by rotary movement draw said section away from the remainder of the strip.

7. In an apparatus for making bags from thermoplastic material, means for intermittently feeding a two-ply, single-fold strip of thermoplastic material, a flat rigid support over which the strip is fed and at which the strip is halted with a bag-sized section thereof extending beyond the edge of the support, a heated element adapted to contact the strip at a point beyond the support to thereby fuse together the plies of the strip and separate the bag-sized section thereof from the remainder of the strip, means for moving the heated element back and forth along a path to and from the strip while the strip is in position of rest, and means for drawing the bag-sized section away from the remainder of the strip upon completion of the combined fusing and separating operation by the heated element.

8. In an apparatus for making bags from thermoplastic material, means for intermittently feeding a two-ply, single-fold strip of thermoplastic material, a flat rigid support over which the strip is fed and at which the strip is halted with a bag-sized section thereof extending beyond the edge of the support, a heated element adapted to contact the strip at a point beyond the support to thereby fuse together the plies of the strip and separate the bag-sized section thereof from the remainder of the strip, means for moving the heated element back and forth along a path to and from the strip while the strip is in position of rest, and a gripping device for engaging the end portion of the bag-sized section and drawing the bag-sized section away from the remainder of the strip immediately upon completion of the combined fusing and separating operation by the heated element.

References Cited in the file of this patent
UNITED STATES PATENTS

| | | |
|---|---|---|
| 255,204 | Stilwell | Mar. 21, 1882 |
| 1,975,121 | Potdevin | Oct. 2, 1934 |
| 2,185,647 | Penn et al. | Jan. 2, 1940 |
| 2,192,527 | Solfisberg | Mar. 5, 1940 |
| 2,474,035 | Crandon | June 21, 1949 |
| 2,737,859 | Allison et al. | Mar. 13, 1956 |